United States Patent [19]

Sano et al.

[11] Patent Number: 5,763,897

[45] Date of Patent: Jun. 9, 1998

[54] NON-UNIFORM THICKNESS OR BANDGAP SUPERLATTICE BETWEEEN CLADDING LAYER AND MULTI-QUANTUM WELL STRUCTURE OF PIN OPTICAL WAVEGUIDE

[75] Inventors: Hirohisa Sano, Niiza; Tatemi Ido, Hachioji, both of Japan

[73] Assignee: Hitachi, Ltd., Tokyo, Japan

[21] Appl. No.: 907,504

[22] Filed: Aug. 8, 1997

Related U.S. Application Data

[63] Continuation of Ser. No. 391,667, Feb. 21, 1995, abandoned.

[30] Foreign Application Priority Data

Feb. 22, 1994 [JP] Japan .................... 6-023911

[51] Int. Cl.$^6$ .................. H01L 29/06; H01L 31/075; H01L 31/153; H01L 31/0232
[52] U.S. Cl. .................. 257/21; 257/15; 257/14; 257/85; 257/185; 257/432
[58] Field of Search ............... 257/9, 12, 14, 257/15, 18, 20, 21, 22, 185, 189, 431, 432, 436; 359/3, 244, 245, 248, 299, 321, 7, 276

[56] References Cited

U.S. PATENT DOCUMENTS

| 4,620,206 | 10/1986 | Ohita et al. | 257/17 |
|---|---|---|---|
| 4,847,573 | 7/1989 | Fukuzawa et al. | 257/12 |
| 4,913,506 | 4/1990 | Suzuki et al. | 350/96.14 |
| 5,001,522 | 3/1991 | Takahashi et al. | 257/14 |
| 5,107,306 | 4/1992 | Blood et al. | 257/15 |
| 5,238,868 | 8/1993 | Elman et al. | 257/12 |
| 5,604,356 | 2/1997 | Shiraishi | 257/17 |

OTHER PUBLICATIONS

"InP-Based Quantum Wells for Electro-OpticWaveguide Circuits", J. E. Zucker, pp. 665–667, AT&T Bell Laboratories, Holmdel, NJ 07733, Conference Proceedings, Fifth International Conference on Indium Phosphide and Related Materials, Apr. 9–22, 1993.

"Multiple Quantum Well (MQW) Waveguide Modulators", T. Wood, Journal of Lightwave Technology, vol. 6, Jun. 1988, pp. 743–757.

"High-Speed InGaAs/InAlAs Multiple-Quantum-Well Optical Modulator", I. Kotaka et al. Denshi Joho Tsushini Gakkai Ronbanshi, vol.74-C-I, No. 11, Nov. 1991, pp. 414–420 and Electronics and Communications in Japan, Part II: Electronics 75 (1992) Jun., No. 6, pp. 24–31.

*Primary Examiner*—Carl W. Whitehead
*Assistant Examiner*—Alice W. Tang
*Attorney, Agent, or Firm*—Antonelli, Terry, Stout & Kraus, LLP

[57] ABSTRACT

In the structure of the device of the invention, a supperlattice buffer layer is formed between the undoped layer and doped layers. This super-lattice buffer layer serves as a carrier-piling up layer in place of the undoped layer in the conventional device. Thus, the amounts of the piled-up carriers in the undoped layer can be greatly reduced and hence no band filling effect occurs in the undoped layer. Consequently, an optical device having a flat frequency characteristic can be produced without losing its modulating characteristic.

21 Claims, 9 Drawing Sheets

N-ELECTRODE

FIG. 6

FIG. 7

NON-UNIFORM THICKNESS OR BANDGAP SUPERLATTICE BETWEEEN CLADDING LAYER AND MULTI-QUANTUM WELL STRUCTURE OF PIN OPTICAL WAVEGUIDE

This application is a continuation application of Ser. No. 08/391,667, filed Feb. 21, 1995, now abandoned.

BACKGROUND OF THE INVENTION

This invention generally relates to optical devices made of semiconductor materials, and particularly to a semiconductor optical device which is required to operate at high speeds.

An optical device associated with this technical field is reported in "High-speed InGaAlAs/InAlAs Multiple Quantum Well Optical Modulators" by Wakita, Kodaka and others, in the 1991-autumn academic lecture (10a-ZN-10) of the Japan Society of Applied Physics. This optical device concerns a high-speed optical phase modulator which utilizes the quantum confined stark effect of the semiconductor multi-quantum well structure.

Figure 1A:
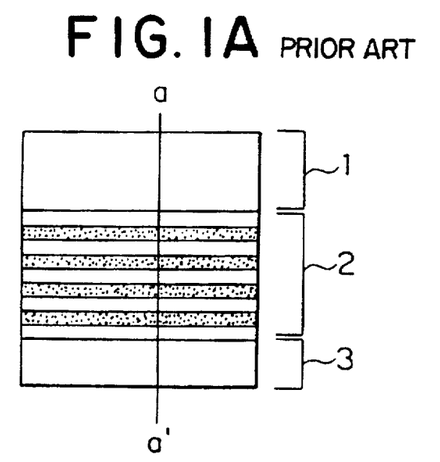
FIGS. 1A, 1B and 1C are diagrams useful to explain the structure of the conventional optical modulator.
Figure 1B:
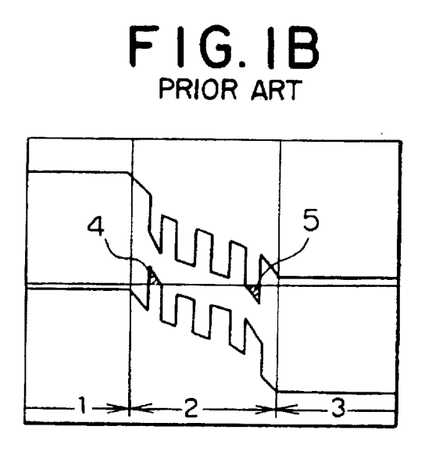
Figure 1C:
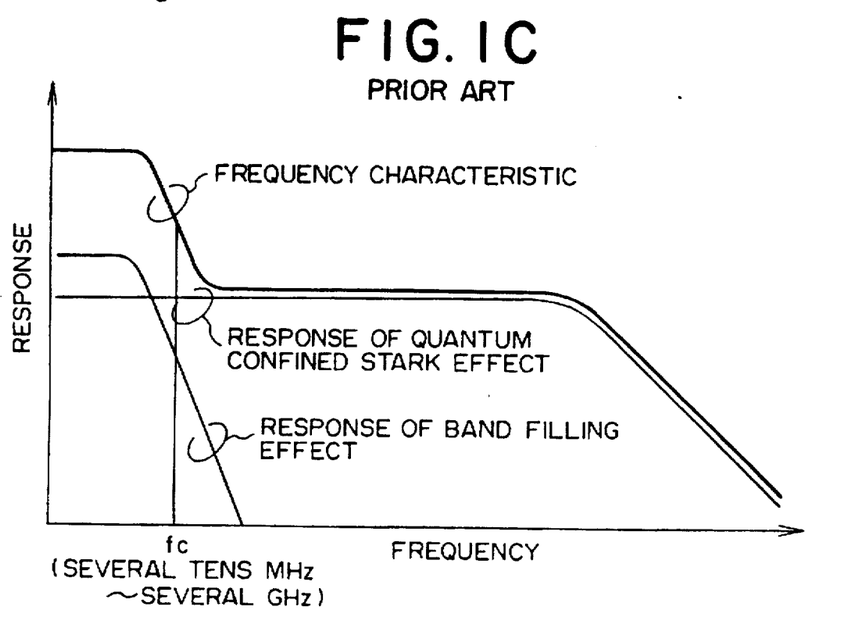

Prior arrangement illustrated in FIGS. 1A–C, however, since an undoped semiconductor multi-quantum well 2 is held between p-and n-doped semiconductor layers 1 and 3, carriers (electrons 4, holes 5) are piled up in some regions of the well layer which are close to the doped layers, as shown in FIGS. 1A and 1B. The amounts of the piled-up carriers change with the intensity of applied electric field, thereby causing a large variation in refractive index through the band filling effect. In this device, thus, the response in the low-frequency region is the addition of the response due to the band filling effect to that due to the quantum confined stark effect of the device itself. However, since the response of the change of refractive index due to the band filling effect is dependent upon the sweep out rate of the carriers, it is generally slow as compared with that due to the quantum confined Stark effect. Thus, in the frequency region over a cut-off frequency (fc) the response due to the band filling effect is impossible as shown in FIG. 1C, and only the response due to Stalk effect occurs. Therefore, the frequency-response of the device shows a two-level characteristic as shown in FIG. 1C and thus the flatness of frequency response is deteriorated.

SUMMARY OF THE INVENTION

The above-mentioned non-flatness of the frequency characteristic greatly deteriorates the output waveform of the optical device. Thus, for example, a fiber optical transmission system to which the device is applied shows poor transmission characteristics.

Accordingly, it is an object of the invention to flatten the frequency response of the conventional optical device, and obtain a device with an excellent output waveform.

The non-flatness of frequency response is caused by the band filling effect of the pile-up carriers around the interface between the undoped and doped layers, as described above. Therefore, in order to make the frequency response flat, it is necessary to solve at least one of the following two problems: (i) decreasing the amounts of piled-up carriers themselves and (ii) reducing the effect of the band filling effect on the operation of the device. This invention solves both problems at a same time.

The structure of the device of the invention has a buffer layer of super-lattice provided in the interface between the undoped and doped layers. This super-lattice layer may be of usual uniform structure. However, it is more effective to make the film thickness and materials not uniform. The insertion of such an extra layer will generally increase the total thickness of the undoped layer, thus reducing the performances, other than frequency response of the device. In this invention, however, the degradations of performance are negligible, since the thickness of additional super-lattice layer is much less than that of the original undoped layer. Thus, the flatness of the frequency characteristic can be achieved without losing the original performance of the device.

The reason why carriers are piled up in the undoped layer is that the Fermi level crosses the well layer with the bands being discontinuous in the hetero interface as shown in FIGS. 1A and 1B. The added super-lattice buffer layer serves as the carrier-piled layer in place of the conventional undoped layer. In the carrier-piled layer, the Fermi level is suddenly bent due to the electric field which the carriers themselves have produced, thus the Fermi level in the undoped layer is not made in contact with the well layer. Therefore, the amount of the piled-up carriers in the undoped layer is greatly decreased so that the band filling effect does not occur in this layer.

In addition, the amounts of the piled-up carriers in the super-lattice buffer layer are smaller than that in the undoped layer of the prior art. The reason for this is that the band gap discontinuity is equivalently reduced in the hetero interface by the quantization of the level in the super-lattice buffer layer. Especially, the amounts of the piled-up carriers can be further decreased in the super-lattice buffer layer by making a super-lattice layer thin which is closer to the doped layer and making a super-lattice thicker as it is away from the doped layer.

The band filling effect is also reduced by the great reduction in the amounts of the piled carriers in the undoped layer. Moreover, by setting the bandgap wavelength of the super-lattice buffer layer much shorter than the operating wavelength of the device, the band filling effect of the super-lattice buffer layer on the operation of the device can be significantly reduced. One example of this is an arrangement wherein the bandgap wavelength of said super-lattice layer is set to a wavelength which is 100 nm or more shorter than the operating wavelength of the device.

Thus, the introduction of the supper-lattice buffer layer makes it possible to simultaneously achieve both the reduction of the amounts of the piled carriers and the reduction of the band filling effect, and achieve the flatness of the frequency response of the device.

DESCRIPTION OF THE PREFERRED EMBODIMENTS

Figure 2A:
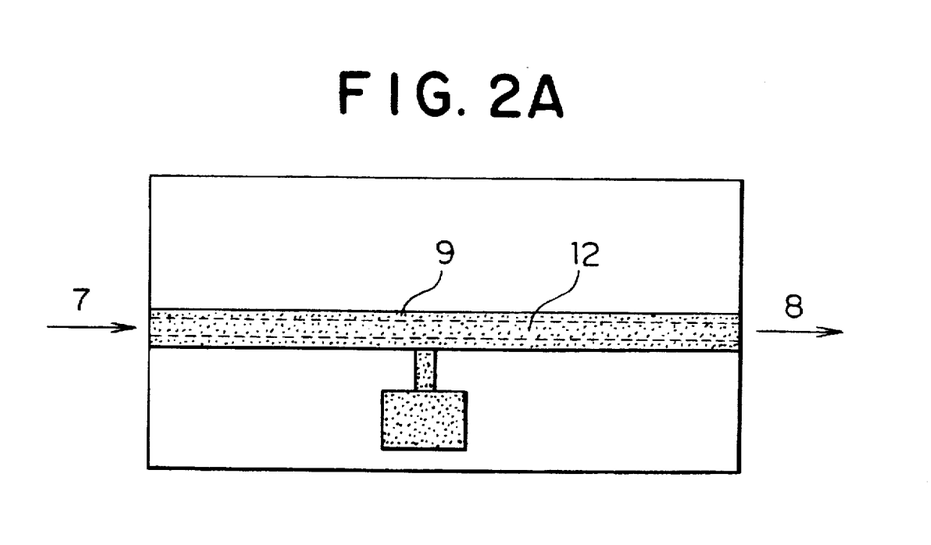
FIGS. 2A, 2B and 2C are a top view, cross-sectional view and band-structure diagram of the optical modulator of the first embodiment of the invention.
Figure 2B:
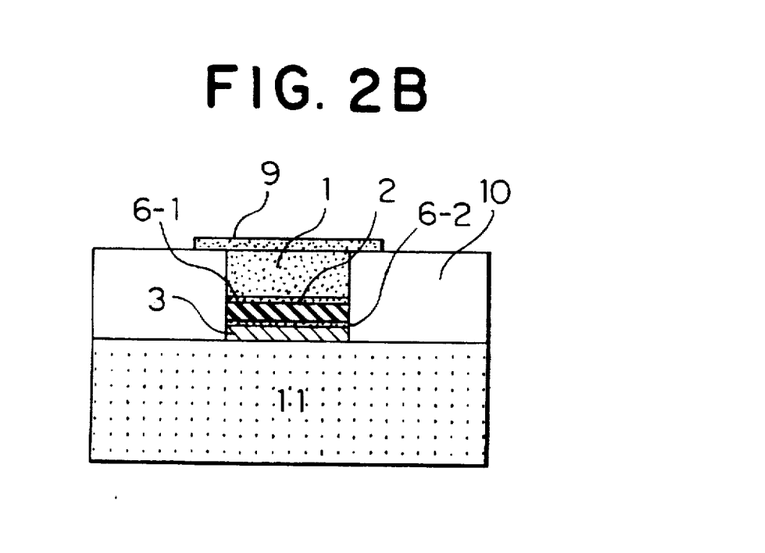
Figure 2C:
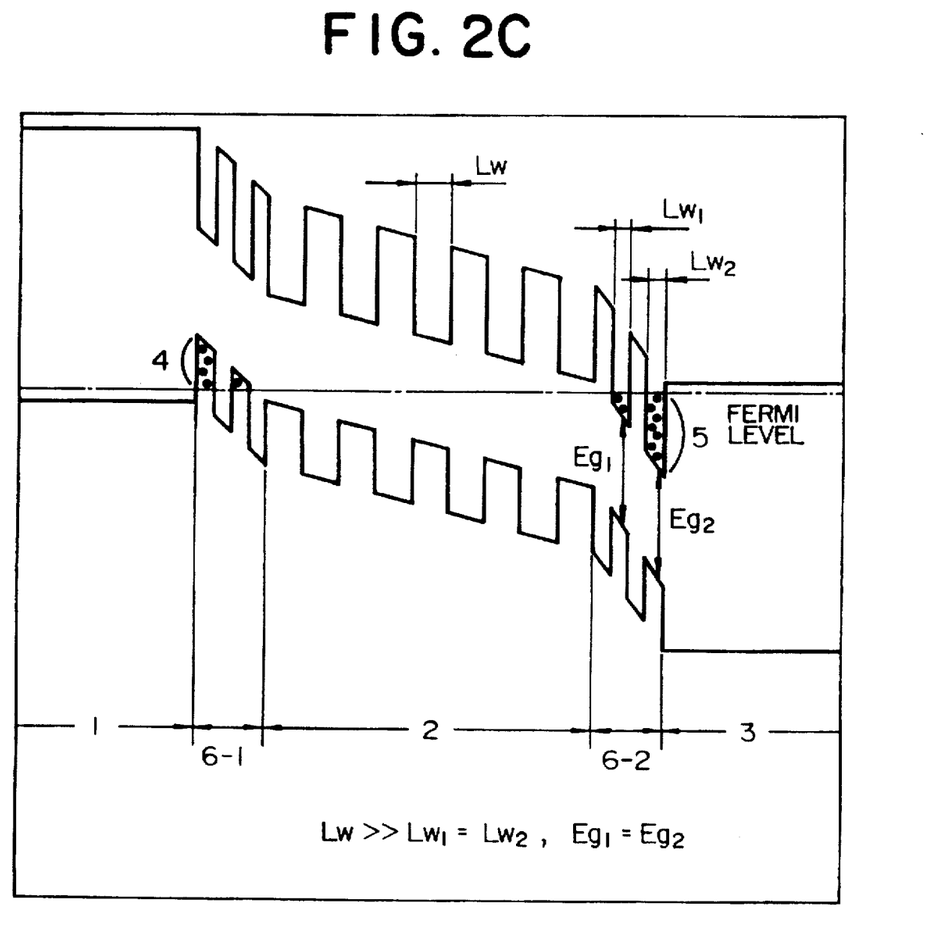

FIGS. 2A to 2C show the first embodiment of the invention. FIG. 2A is a top view of the optical modulator into which the structure of this device has been introduced. FIG. 2B is a cross-sectional view of the modulator and FIG. 2C is a diagram of the band structure of a main part of the device. Incident light 7 is modulated in its phase by a high-frequency electrical signal which is supplied to an electrode 9 formed on an optical waveguide 12, and exits as output light 8. The optical waveguide 12 has the structure that the multi-quantum well 2 is stacked between the p- and n-doped cladding layers 1 and 3. The feature of the invention is to have super-lattice buffer layers 6-1, 6-2 stacked between the multi-quantum well 2 and the cladding layer 1, 3. Shown at 10 is a buried layer. The introduction of the super-lattice buffer layers makes it possible to equivalently reduce the band discontinuity in the hetero junction between the multi-quantum well layer and the cladding layers, so that carriers are not piled up in the multi-quantum well layer. FIG. 2C shows this situation. That is, as illustrated, piled electrons 4 and piled holes 5 are produced within the super-lattice buffer layers 6-1, 6-2, but they are not produced in the multi-quantum well layer. In addition, the bending of the band within the thin super-lattice layer is increased due to the effect of the carriers piled up in the super-lattice layer, so that the amounts of the piled carriers within the multi-quantum well are greatly reduced. In other words, the effect of carrier piling up in the quantum well is greatly reduced by the introduction of the supper-lattice buffer layer, which is thin enough as compared with the multi-quantum well layer, thereby preventing reduction in the modulation efficiency due to increase of film thickness.

In order to prove this approach, a trial device was actually fabricated. In the trial device, a material of InGaAs(6 nm)/InAlAs(6 nm), 25 periods, was used for the multi-quantum well layer and a material of InGaAs(3 nm)/InAlAs(3 nm), 3 periods, was used for the super-lattice buffer layers. In the ordinary structure in which the super-lattice buffer layer is not introduced, an increase of 6 dB of the frequency response at frequencies below 1000 MHz was observed. On the other hand, in the trial device with super-lattice layer, only an increase of about 0.5 dB of the frequency response was observed, and thus the effectiveness of this invention was able to be confirmed. At this time, the total thickness of the super-lattice buffer layers was about 10% of the thickness of the multi-quantum well layer, and the electric field strength in the multi-quantum well layer was also reduced about 10% by the introduction of the super-lattice buffer layer. Therefore, the increase of the driving voltage to the device is as small as about 10%.

Figure 3A:
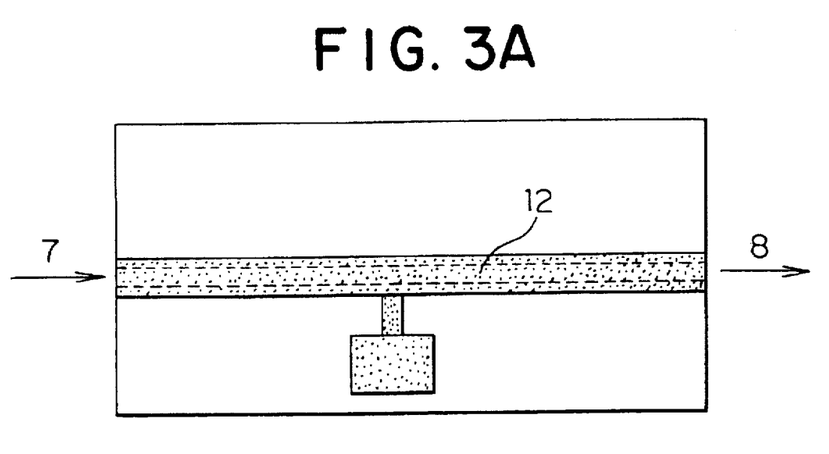
FIGS. 3A, 3B, 3C, and 3D are a top view, cross-sectional view, band-structure diagram and enlargement of cross-sectional view of the device of the second embodiment of the invention.
Figures 3B, 3D:
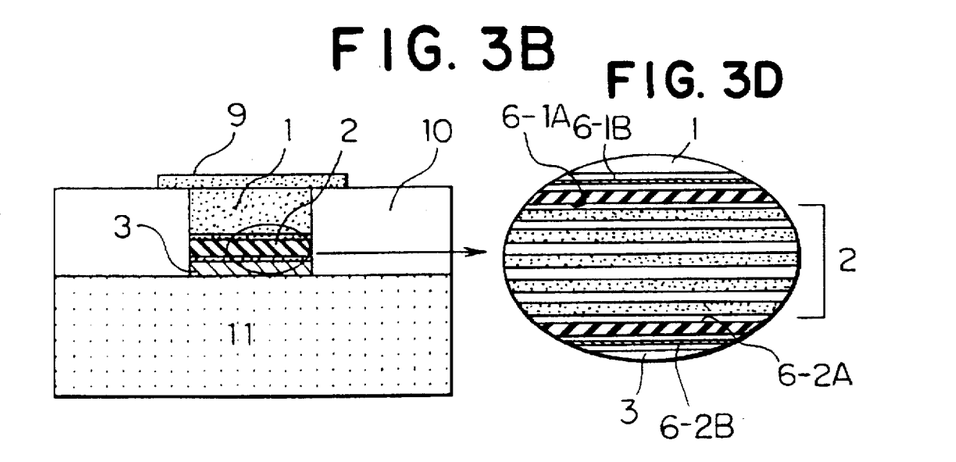
Figure 3C:
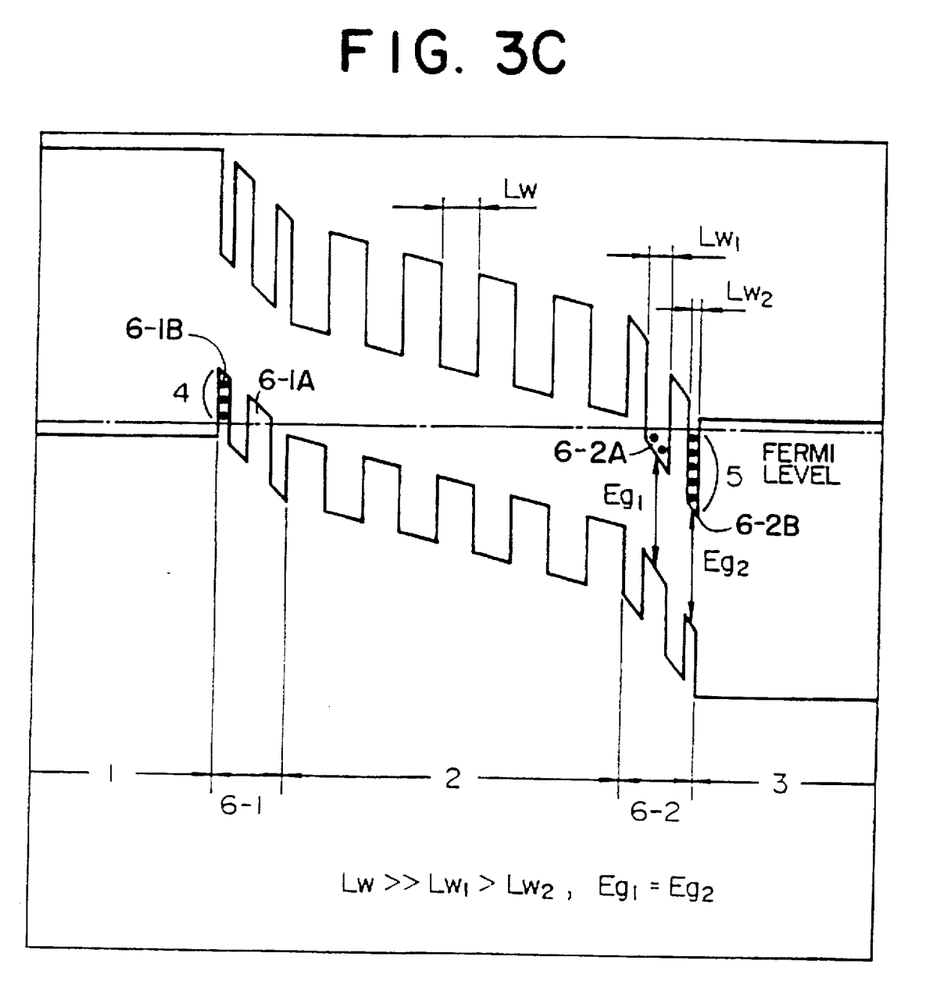

FIGS. 3A to 3C show another embodiment of the invention. The feature of this embodiment resides in making the thicknesses of the super-lattice buffer layer. nonuniform. The super-lattice buffer layer, as shown in FIG. 3B, is set to be thin 6-1B, 6-2B at around the cladding layer but to be thicker 6-1A, 6-2A at the multi-quantum well layer side. Thus, it is possible to equivalently widen the bandgap of the layer near the clad layer and narrow the bandgap of the layer near the multi-quantum well. Thus, the discontinuity between bands is substantially reduced, so that the amounts of the piled-up carriers within the super-lattice layer can be decreased. Therefore, it is possible to reduce the band filling effect in the super-lattice layer. A device was actually test-fabricated and was examined to confirm this effect. As a result, it was confirmed that the response increase at low frequencies was reduced from about 0.5 dB of the uniform super-lattice layer to about 0.2 dB.

Figure 4A:
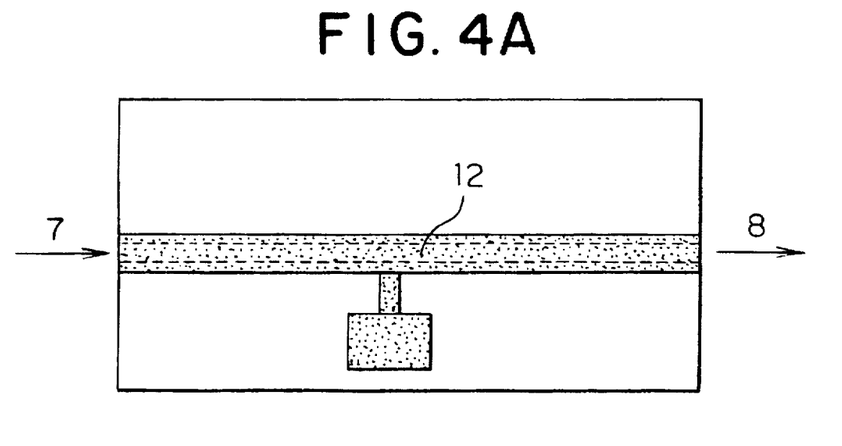
FIGS. 4A, 4B, 4C, and 4D are a top view, cross-sectional view, band-structure diagram and enlargement of cross-sectional view of the device of the third embodiment of the invention.
Figures 4B, 4D:
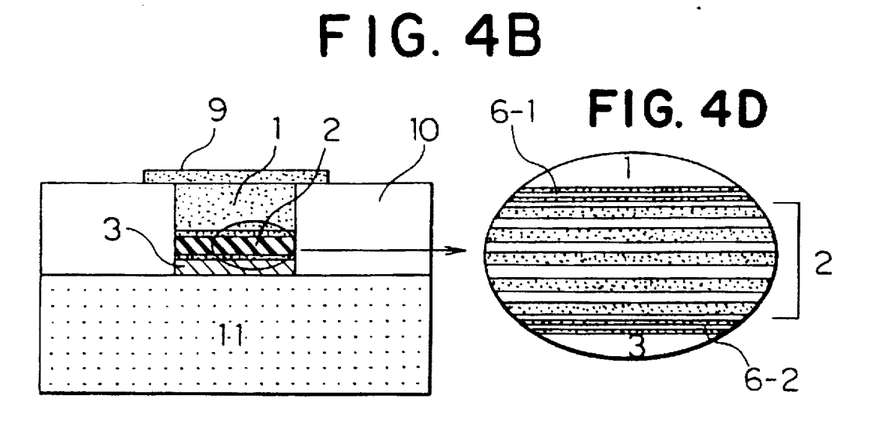
Figure 4C:
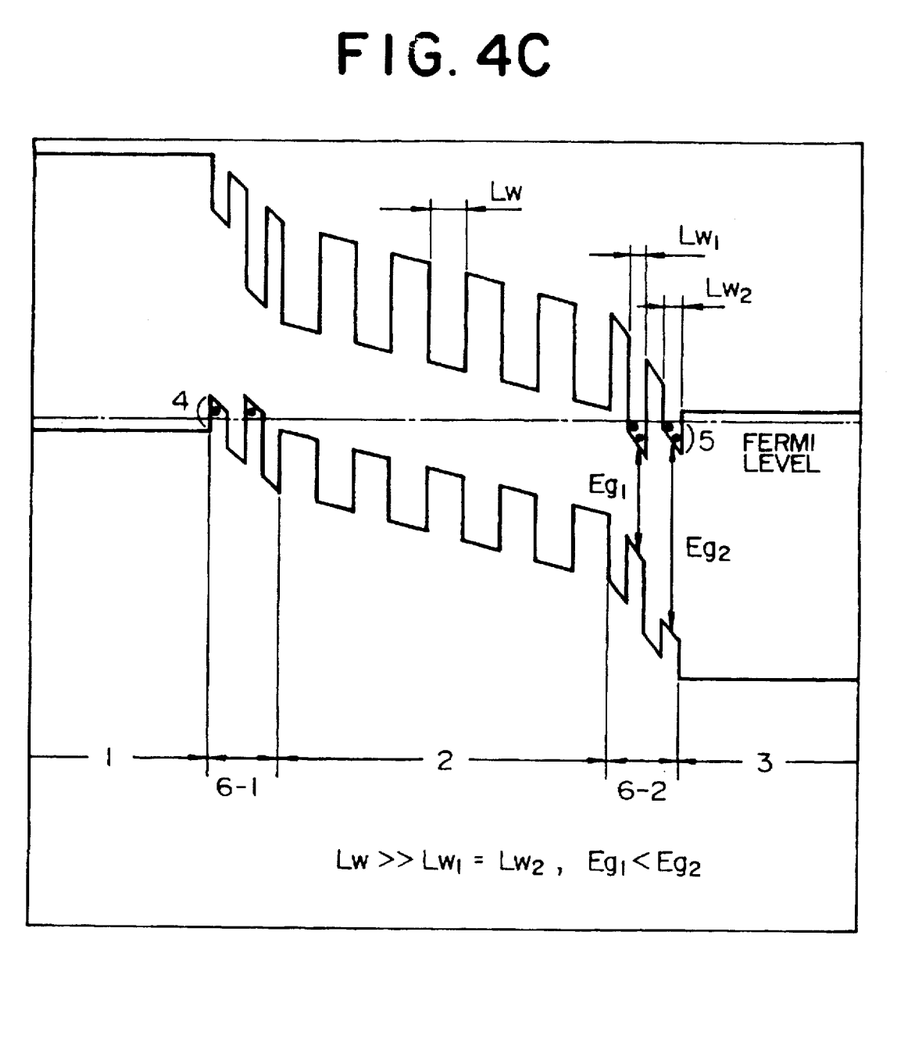

FIGS. 4A to 4C show still another embodiment of the invention. The feature of this embodiment resides in making the composition of the super-lattice buffer layer nonuniform. The super-lattice buffer layer, as shown in FIG. 3B, is set to have a wide bandgap at around the cladding layer but a narrow bandgap at the multi-quantum well layer side. As is similar to the case of FIGS. 3A–3C, the discontinuity between bands is reduced and thus the amounts of the piled up carriers within the super-lattice layer can be decreased. Therefore, it is possible to weaken the band filling effect in the super-lattice layer. Actually a device was test-fabricated and was examined to confirm this effect. From the results of this examination, it was confirmed that the response increase at low frequencies was reduced from about 0.5 dB of the uniform super-lattice layer to about 0.2 dB.

Figure 5A:
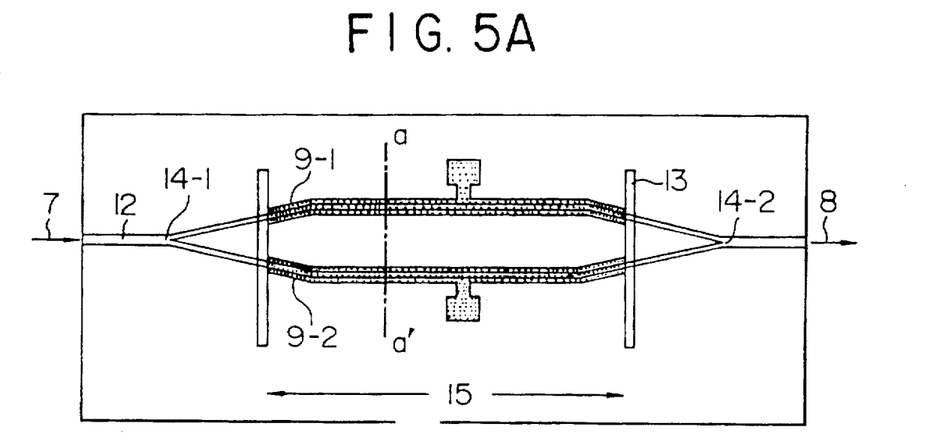
FIGS. 5A, 5B and 5C are a top view, cross-sectional view, and enlargement of cross-sectional view of another embodiment according to the present invention.
Figure 5B:
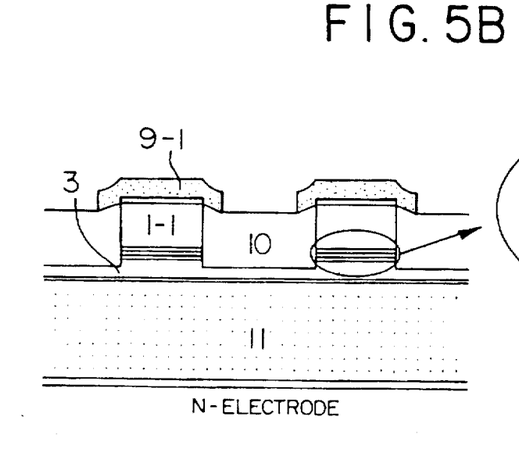
Figure 5C:
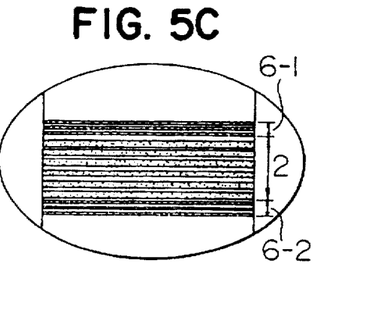

FIGS. 5A and 5B show another embodiment of the present invention. In this embodiment, the present invention is applied to an optical modulator of the Mach-Zehnder type. FIGS. 5A and 5B are a top view and a cross-sectional view of the optical modulator, respectively.

In the figures, an incident light 7 advances through an optical wave guide 12 and is divided into two lights of the same light intensity by a Y-shaped branching optical wave guide 14-1 before they pass through a light phase modulator part 15. Each of electrodes 9-1 and 9-2 is electrically insulated by an isolation groove 13. Having been subjected to a phase change by the light phase modulator part 15, the phase difference between the two lights which are superposed together at another Y-shaped branching optical wave guide 14-2 varies from in-phase (zero phase difference) to opposite phase ($\pi$ phase difference), thereby changing the intensity of the output light.

In this embodiment, a multi-quantum well structure is employed such that an upper super-lattice buffer layer and a lower super-lattice buffer layer are disposed in the optical phase modulator part, thereby achieving a high phase modulation efficiency of the multi-quantum well structure and a flat frequency response by virtue of the introduction of the super-lattice buffer layers, at the same time. In the case of a trial device having the device length of about 1.4 mm (0.7 mm in the length of the electrode part), it was confirmed that the device operated on the driving voltage of 4 Volts or less. It was also confirmed that the device had a flat frequency response extending up to 10 GHz (<1 dB). Thus, the effect of the super-lattice buffer layers was confirmed.

Figure 6:
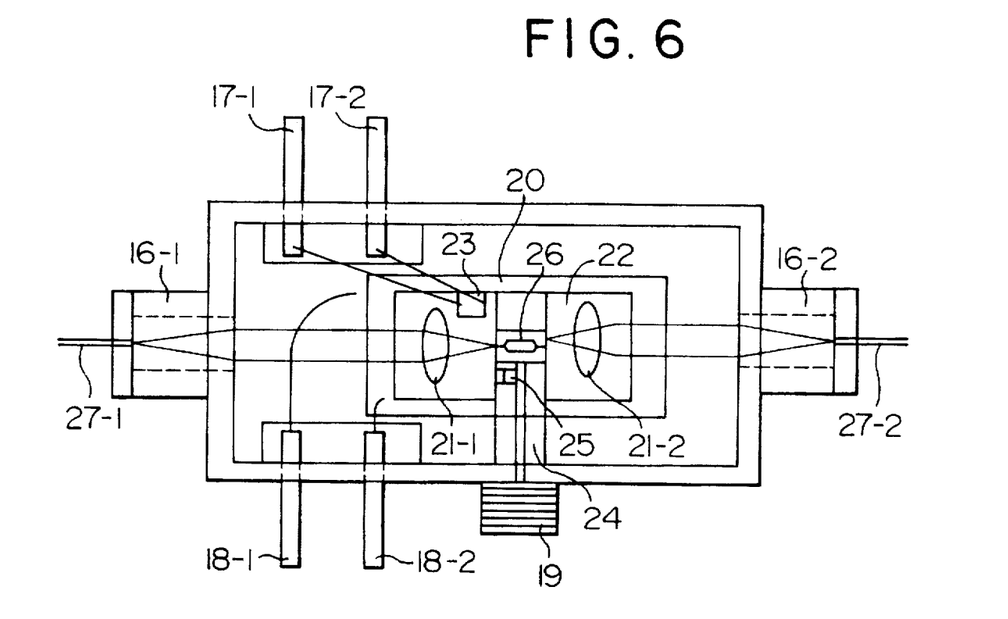
FIG. 6 is a view showing a further embodiment according to the present invention.

FIG. 6 shows still another embodiment of the present invention. In this embodiment, an optical device according to the present invention is used in a light modulator module.

In the figure, a light modulator 26 is fixedly mounted on a mount 22 on which a high-frequency substrate 24 is mounted. A light from an optical fiber 27-1 is collimated by means of a SELFOC lens 16-1 and is then converged again so as to be incident to the device via a lens 21-1 mounted on the mount 22. The light emitting from the device is propagated to an optical fiber 27-2 disposed on the emitting side via lenses 21-2 and 16-2. The mount 22 is mounted on a Peltier device 20 so that the temperature of the mount is kept constant by controlling the temperature by using a signal from a thermistor (not shown) disposed on the mount. The signal is obtained from the thermistor via terminals 17-1 and 17-2. The Peltier device 20 is driven via terminals 18-1 and 18-2. The light modulator is driven by a high-frequency signal applied through a high frequency connector 19. A terminating resistor 25 is disposed in parallel with the device on the high frequency substrate 24 to attain impedance matching with the driving circuit. A light modulator module of this embodiment was actually test-fabricated and it was confirmed that the module had a frequency response over 10 GHz, which is sufficient for applications to optical transmission systems.

Figure 7:
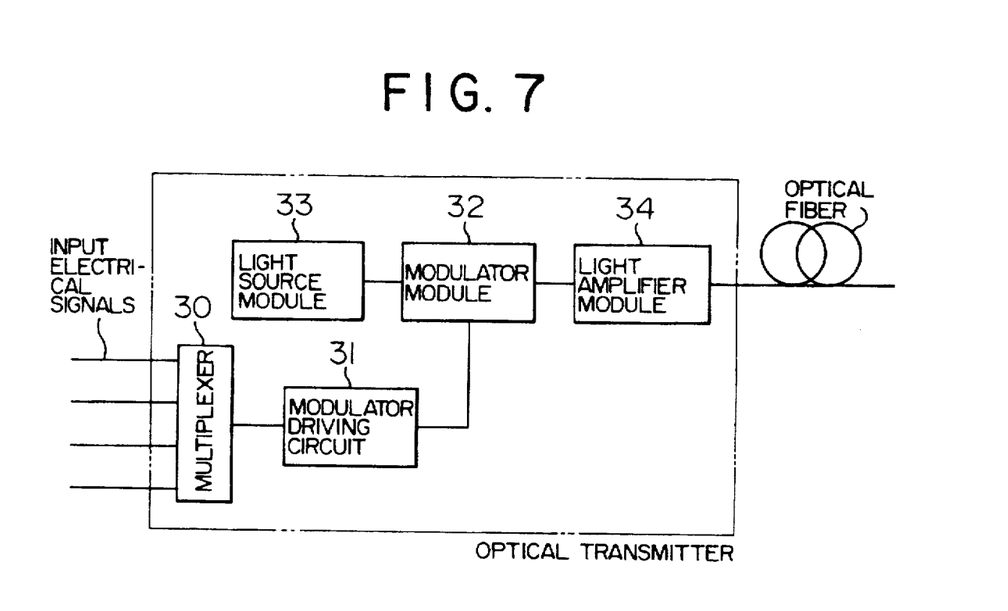
FIG. 7 is a block diagram of a further embodiment according to the present invention.

FIG. 7 is a block diagram of an optical transmission system employing a light modulator module according to still another embodiment of the present invention. In FIG. 7, a light modulator is employed in a transmitting system.

In the figure, input electrical signals are converted to a high speed electrical signal through a multiplexer 30. Then, the high speed electrical signal is converted to an electrical signal having a fixed amplitude by a driving circuit 31 and is applied to a light modulator module 32. A light source module 33 is oscillating at a predetermined wavelength to emit a light to the light modulator module. The light received by the light modulator module is modulated by the above-mentioned driving electrical signal to form an intensity light modulated signal. A light amplifier module 34 receives the intensity light modulated signal and amplifies the light intensity thereof and outputs the amplified light signal.

The flattening of the frequency response characteristic of the light modulator according to the present invention is effective in improving the transmission characteristics. It was confirmed that 2 to 3 dB raise in the reception sensitivity was achieved as compared to a system employing a conventional light modulator.

While in the embodiments mentioned above the undoped layer is used as the multi-quantum well layer, the same effect occurs even if a bulk semiconductor is used for that layer. In addition, the super-lattice buffer layer is not necessarily formed on both sides, but may be provided only on the side at which the piling-up of carriers causes a problem, in which case a great effect can be expected.

According to this invention, an optical device having a flat frequency characteristic can be produced without losing the modulating characteristic of the device.

We claim:

1. A semiconductor optical device comprising:
    an optical waveguide comprising at least one pair of a n-type dope cladding layer and a p-type doped cladding layer, and a multi-quantum well formed of semiconductor multi-layers stacked between said n-type dope cladding layer and said p-type doped cladding layer, a bandgap of said multi-quantum well being different from at least one of said cladding layers,
    an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well,
    wherein said super-lattice layer is a multi-layer arrangement having a first super-lattice layer which is thinner in thickness than a thickness of said semiconductor layers and which is disposed adjacent said multi-quantum well, and a second super-lattice layer which is thinner in thickness than a thickness of said first super-lattice layer and which is disposed adjacent to at least one of said doped cladding layers.

2. A semiconductor optical device according to claim 1, wherein a bandgap wavelength of super-lattice layer is set to a wavelength which is 100 nm or more shorter than a wavelength of the incident light.

3. A semiconductor optical device according to claim 1, wherein said semiconductor optical device is at least a part of a semiconductor modulator.

4. A semiconductor optical device according to claim 1, wherein said semiconductor optical device is at least a part of an optical module.

5. A semiconductor optical device according to claim 1, wherein said optical module is at least a part of an optical transmission system.

6. A semiconductor optical device comprising:
    an optical waveguide comprising at least one pair of a n-type doped cladding layer and a p-type doped cladding layer, and a multi-quantum well formed of semiconductor multi-layers stacked between said n-type doped cladding layer and said p-type doped cladding layer, a bandgap of said multi-quantum well being different from at least one of said cladding layers,
    an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well,
    wherein super-lattice layer is set to have a predetermined bandgap at around a cladding layer side, but a narrower bandgap than said predetermined bandgap at a multi-quantum well side.

7. A semiconductor optical device according to claim 6, wherein a bandgap wavelength of super-lattice layer is set to a wavelength which is 100 nm or more shorter than a wavelength of the incident light.

8. A semiconductor optical device according to claim 6, wherein said semiconductor optical device is at least a part of a semiconductor modulator.

9. A semiconductor optical device according to claim 6, wherein said semiconductor optical device is at least a part of an optical module.

10. A semiconductor optical device according to claim 6, wherein said optical module is at least a part of an optical transmission system.

11. A semiconductor optical device comprising:
    an optical waveguide comprising at least one pair of a n-type doped cladding layer and a p-type doped cladding layer, and a multi-quantum well formed of semiconductor multi-layers stacked between said n-type doped cladding layer and said p-type doped cladding layer, a bandgap of said multi-quantum well being different from at least one of said cladding layers,
    an electrode for applying an electric field to said multi-quantum well so as to modulate incident light in its phase, said incident light passing through said optical waveguide along the semiconductor multi-layers of said multi-quantum well, and
    a super-lattice layer provided in at least one of interfaces between said cladding layer and said multi-quantum well, said super-lattice serving as such an interface portion such that a Fermi level in said multi-quantum well is not made in contact with a conduction band and valence band of said multi-quantum well,
    wherein said super-lattice layer is a multi-layer arrangement having a first super-lattice layer which is thinner in thickness than a thickness of said semiconductor layers and which is disposed adjacent said multi-quantum well, and a second super-lattice layer which is thinner in thickness than a thickness of said first super-lattice layer and which is disposed adjacent to at least one of said doped cladding layers.

12. A semiconductor optical device according to claim 11, wherein a bandgap wavelength of super-lattice layer is set to a wavelength which is 100 nm or more shorter than a wavelength of the incident light.

13. A semiconductor optical device comprising:

an optical waveguide comprising at least one pair of a n-type doped cladding layer and a p-type doped cladding layer, and a multi-quantum well formed of semiconductor multi-layers stacked between said n-type doped cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along semiconductor layers of said multi-quantum well, and a super-lattice layer provided in at least one of interfaces between said cladding layer and said multi-quantum well, wherein said super-lattice layer makes it possible to equivalently reduce band gap discontinuity in a hetero junction between said cladding layer and said multi-quantum well, so that carriers are not piled up in said multi-quantum well, wherein said super-lattice layer a multi-layer arrangement having a first super-lattice layer which is thinner in thickness than a thickness of said semiconductor layers and which is disposed adjacent said multi-quantum well, and a second super-lattice layer which is thinner in thickness than a thickness of said first super-lattice layer and which is disposed adjacent to at least one of said doped cladding layers.

14. A semiconductor optical device according to claim 13,
wherein said super-lattice layer is provided in both of interfaces between said cladding layer and said multi-quantum well.

15. A semiconductor optical device comprising:

an optical waveguide comprising at least one pair of a n-type doped cladding layer and a p-type doped cladding layer, and an multi-quantum well formed of semiconductor multi-layers stacked between said n-type doped cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well, said super-lattice serving as such an interface portion such that a Fermi level in said multi-quantum well is not made in contact with a conduction band and valence band of said multi-quantum well, wherein said super-lattice layer is set to have a predetermined bandgap at around a cladding layer side, but a narrower bandgap than said predetermined bandgap at a multi-quantum well side.

16. A semiconductor optical device according to claim 15,
wherein a bandgap wavelength of super-lattice layer is set to a wavelength which is 100 nm or more shorter than a wavelength of the incident light.

17. A semiconductor optical device comprising:

an optical waveguide comprising at least one pair of a n-type doped cladding layer and a p-type doped cladding layer, and a multi-quantum well formed of semiconductor multi-layers stacked between said n-type doped cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well, wherein said super-lattice layer is provided in both of interfaces between said cladding layer and said multi-quantum well, wherein said super-lattice layer is a multi-layer arrangement having a first super-lattice layer which is thinner in thickness than a thickness of said semiconductor layers and which is disposed adjacent said multi-quantum well, and a second super-lattice layer which is thinner in thickness than a thickness of said first super-lattice layer and which is disposed adjacent to at least one of said doped cladding layers.

18. A semiconductor optical device comprising:

an optical waveguide comprising at least one pair of a n-type doped cladding layer and a p-type doped cladding layer, and a multi-quantum well formed of semiconductor multi-layers stacked between said n-type doped cladding, layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well, wherein said super-lattice layer is provided in both of interfaces between said cladding layer and said multi-quantum well, wherein super-lattice layer is set to have a predetermined bandgap at around a cladding layer side, but a narrower bandgap than said predetermined bandgap at a multi-quantum well side.

19. A semiconductor optical device comprising:

an optical waveguide comprising at least one pair of a n-type doped cladding layer and a p-type doped cladding layer, and an multi-quantum well formed of semiconductor multi-layers stacked between said n-type dope cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well, said super-lattice serving as such an interface portion such that a Fermi level in said multi-quantum well is not made in contact with a conduction band and valence band of said multi-quantum well, wherein said super-lattice layer is provided in both of interfaces between said cladding layer and said multi-quantum well, wherein said super-lattice layer is a multi-layer arrangement having a first super-lattice layer which is thinner in thickness than a thickness of said semiconductor layers and which is disposed adjacent said multi-quantum well, and a second super-lattice layer which is thinner in thickness than a thickness of said first super-lattice layer and which is disposed adjacent to at least one of said doped cladding layers.

20. A semiconductor optical device comprising:

an optical waveguide comprising at least one pair of a n-type doped cladding layer and a p-type doped cladding layer, and an multi-quantum well formed of semiconductor multi-layers stacked between said n-type doped cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along the semiconductor multi-layers of said multi-quantum well, and a super-lattice layer provided in at least one of interfaces between said cladding layer and said multi-quantum well, said super-lattice serving as such an interface portion such that a Fermi level in said multi-quantum well is not made in contact with a conduction band and valence band of said multi-quantum well, wherein said super-lattice layer is provided in both of interfaces between said cladding layer and said multi-quantum well, wherein said super-lattice layer is set to have a predetermined bandgap at around a cladding layer side, but a narrower bandgap than said predetermined bandgap at a multi-quantum well side.

21. A semiconductor optical device comprising:

an optical waveguide comprising at least one pair of a n-type doped cladding layer and a p-type doped cladding layer, and a multi-quantum well formed of semiconductor multi-layers stacked between said n-type doped cladding layer and said p-type doped cladding layer, a bandgap of said multi-quantum well being different from at least one of said cladding layers, an electrode for applying an electric field to said multi-quantum well so as to modulate incident light in its phase, said incident light passing through said optical waveguide along semiconductor layers of said multi-quantum well, and a super-lattice layer provided in at least one of interfaces between said cladding layer and said multi-quantum well, wherein said super-lattice layer makes it possible to equivalently reduce band gap discontinuity in a hetero junction between said cladding layer and said multi-quantum well, so that carriers are not piled up in said multi-quantum well, wherein super-lattice layer is set to have a predetermined bandgap at around a cladding layer side, but a narrower bandgap than said predetermined bandgap at a multi-quantum well side.

* * * * *